(12) United States Patent
Luo et al.

(10) Patent No.: US 11,460,246 B2
(45) Date of Patent: Oct. 4, 2022

(54) RECOVERY OF KRYPTON AND XENON FROM LIQUID OXYGEN

(71) Applicant: Air Products and Chemicals, Inc., Allentown, PA (US)

(72) Inventors: Xukun Luo, Allentown, PA (US); Alan D. Berger, Ambler, PA (US); Donn Michael Herron, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 169 days.

(21) Appl. No.: 16/718,978

(22) Filed: Dec. 18, 2019

(65) Prior Publication Data
US 2021/0190422 A1  Jun. 24, 2021

(51) Int. Cl.
*F25J 3/00* (2006.01)
*F25J 3/04* (2006.01)
*B01D 5/00* (2006.01)

(52) U.S. Cl.
CPC ........ *F25J 3/04745* (2013.01); *B01D 5/0006* (2013.01); *B01D 5/0063* (2013.01); *F25J 3/04642* (2013.01); *F25J 3/04896* (2013.01)

(58) Field of Classification Search
CPC .......... F25J 3/00; F25J 3/04028; F25J 3/0462; F25J 3/04745; F25J 3/04751;
(Continued)

(56) References Cited

U.S. PATENT DOCUMENTS 2,057,459 A * 10/1936 Nuys ............... F25J 3/04745
62/925
3,768,270 A * 10/1973 Schuftan ........... F25J 3/04745
62/925
(Continued)

FOREIGN PATENT DOCUMENTS

CN   102767936 A   11/2012
CN   1022767936 A  11/2012
(Continued)

OTHER PUBLICATIONS

Disclosed anonymously, "Crude Krypton/Xenon Recovery from a Pumped-LOX ASU Cycle", 42517, 1158, Research Disclosure, Sep. 1999.
(Continued)

*Primary Examiner* — Miguel A Diaz
*Assistant Examiner* — Erik Mendoza-Wilkenfel
(74) *Attorney, Agent, or Firm* — Matthew R. Weaver (57) ABSTRACT

Xenon and/or krypton is separated from a liquid oxygen stream comprising oxygen and xenon and/or krypton in a process comprising providing at least a portion of the liquid oxygen stream as a reflux liquid to the top of a rare gas recovery column operated at a pressure of between 5 to 25 bara, vaporizing a reboiler liquid in the reboiling zone in the bottom of the rare gas recovery column to produce a mixture of a rising vapor and a xenon and/or krypton-enriched liquid stream; and contacting the rising vapor with the reflux liquid in at least one distillation zone of the column to effect stripping xenon and/or krypton from the rising vapor to the reflux liquid. The process provides a recovery of xenon of greater than 90% and a krypton recovery of 15% to 90%.

20 Claims, 3 Drawing Sheets

(58) Field of Classification Search
CPC .. F25J 3/04642; F25J 3/04896; F25J 2215/34; F25J 2215/36; F25J 2200/02; F25J 2250/00; F25J 2250/02; F25J 2250/04; F25J 2250/10; F25J 2250/30; F25J 2250/40; F25J 2250/42; F25J 2250/50; F25J 2250/52; C01B 2210/0035; C01B 2210/0037; B01D 5/0006; B01D 5/0063
See application file for complete search history.

(56) References Cited

U.S. PATENT DOCUMENTS

| | | | |
|---|---|---|---|
| 3,779,028 | A | 12/1973 | Schuftan et al. |
| 4,357,153 | A * | 11/1982 | Erickson ............... F25J 3/04351 62/651 |
| 4,574,006 | A * | 3/1986 | Cheung ................ F25J 3/04363 62/925 |
| 4,805,412 | A | 2/1989 | Colley |
| 5,039,500 | A | 8/1991 | Shino et al. |
| 5,122,173 | A * | 6/1992 | Agrawal ............... F25J 3/04854 62/925 |
| 5,913,893 | A | 6/1999 | Gary et al. |
| 6,301,929 | B1 * | 10/2001 | Lochner ............... F25J 3/04412 62/643 |
| 6,378,333 | B1 | 4/2002 | Dray |
| 6,662,593 | B1 | 12/2003 | Higginbotham et al. |
| 6,694,775 | B1 | 2/2004 | Higginbotham et al. |
| 6,829,907 | B2 | 12/2004 | Higginbotham et al. |
| 6,848,269 | B2 | 2/2005 | Higginbotham et al. |
| 2013/0152628 | A1 * | 6/2013 | Find ..................... B01D 53/002 62/620 |

FOREIGN PATENT DOCUMENTS

| | | |
|---|---|---|
| DE | 19855485 | 6/1999 |
| DE | 60208641 T2 | 11/2006 |
| EP | 0218740 | 9/1989 |
| FR | 2967244 | 5/2011 |
| JP | 9002808 | 1/1997 |

OTHER PUBLICATIONS

R. Agrawal, et al., "Air Liquefaction: Distillation", Journal of AOAC International, 78, 2000, pp. 1895-1910.

Disclosed anonymously, "Krypton/Xenon Recovery Ideas", 42517, 1158, Research Disclosure, IP.com, IP.com, Inc. New York, USA, XP013115812, Sep. 2006, 3 pgs.

Agrawal R et al: Heat Pumps for Thermally Linked Distillation Columns: An Exercise for Argon Production From Air11, Industrial & Engineering Chemistry Research, American Chemical Society, vol. 33, No. 11, Jan. 1, 1994 (Jan. 1, 1994), pp. 2717-2730, XP009061446.

* cited by examiner

RECOVERY OF KRYPTON AND XENON FROM LIQUID OXYGEN

FIELD OF THE INVENTION

The present invention relates generally to the field of air separation and has particular reference to the crude recovery of at least one rare gas selected from the group consisting of krypton and xenon from liquid oxygen.

BACKGROUND OF THE INVENTION

Conventional methods and devices for the recovery of krypton and xenon from liquid oxygen streams are generally known. Problems exist with these conventional methods and devices, such as: low xenon and/or krypton recovery, high power, limited or restrictive operating pressures, and difficulty integrating the recovery process into the main air separation plant. A need exists for an improved method and device.

Krypton and xenon are present in air at very low concentrations, typically about 1.14 parts per million ("ppm") and about 0.087 ppm respectively. They are both valuable gases and, thus, there is an economic incentive to maximize their recovery in an air separation process. In addition, the xenon is of considerably higher value than krypton, so a process that could operate with high xenon recovery, but adjustable krypton recovery would be useful.

In typical cryogenic air distillation processes for oxygen recovery, krypton and xenon concentrate in the liquid oxygen ("LOX") product taken from the bottom of the low pressure ("LP") distillation column as they are far less volatile than oxygen. The smaller the LOX flow, therefore, the more concentrated the krypton and xenon is in this product.

In cryogenic air distillation processes in which most of the oxygen product is removed from the LP column in the gas phase, it is possible to make sure that very little krypton and xenon is lost in the gaseous oxygen ("GOX") by removing the GOX one or several distillation stages above the bottom of the LP column. These bottom guard stages are used mainly to prevent excessive loss of krypton which is substantially more volatile than xenon. When product oxygen is withdrawn as a vapor from the LP column, almost all of the krypton and xenon entering the air separation plant can then be recovered in the LOX product, which is a very small proportion of the total oxygen flow. This LOX product can then be processed to produce a purified rare gas product. In the event that it is primarily a xenon product that is required, one could dispense with most or all the bottom guard stages and still recover a small fraction of the krypton and almost all of the xenon entering the plant in the LOX product.

Most present-day cryogenic air distillation processes for oxygen recovery no longer withdraw the primary oxygen product as a vapor. Rather, all the recovered oxygen is withdrawn from the bottom of the LP column as LOX, pumped to the required pressure and evaporated in the main heat exchanger. In such a case all the krypton and xenon are lost. Even when the LOX product is taken several stages above the bottom of the LP column, and a small krypton and xenon containing liquid purge is withdrawn from the bottom, the recovery is severely limited. An overview of the pumped-LOX process can be found in Journal of AOAC International 78: 1010-1018. AIR LIQUEFACTION: DISTILLATION. R. Agrawal and D. M. Herron.

The limited recovery can be explained as follows. Essentially all of the krypton and xenon entering the air separation plant flows as a liquid down the LP column towards the bottom. Any liquid withdrawal from a location above the bottom will contain krypton and xenon proportional to the total liquid withdrawn as LOX Product. This will typically lead to losses of approximately 30% of these valuable products.

It is desirable, therefore, to increase the recovery of krypton and xenon from an air separation plant in which at least part of the oxygen product is withdrawn from the column as LOX.

When an existing plant withdraws the main oxygen product as a liquid, for example pumped-LOX cycle plants, there is usually no small stream that contains concentrated rare gas components. Therefore, as krypton and xenon are so valuable, it is also desirable to be able to retrofit rare gas recovery systems to existing plants.

In addition, it is desirable to provide a xenon and/or krypton recovery plant which can process rare gas-enriched feed streams from an external source, such as liquid oxygen from a storage tank.

U.S. Pat. No. 3,779,028 discloses a process for the recovery of krypton and xenon from an air separation column.

EP-0218740-B1 discloses a process for recovering three product streams from an air separation plant. The GOX and LOX products are depleted of rare gases, and the third product is a rare-gas concentrate liquid enriched in krypton and xenon that is made by processing the LOX from the LP column sump or from storage.

U.S. Pat. No. 6,301,929 discloses an air separation process in which a rare gas-lean LOX stream and a rare gas-enriched LOX stream are formed.

DE-A-19855485 discloses an air separation process in which rare gas-lean LOX and rare gas-enriched LOX are formed in the LP column.

U.S. Pat. No. 6,694,775 discloses the recovery of a liquid stream containing rare gases from pressurized LOX by at least partially vaporizing at least a portion of the pressurized LOX and sending the resultant vapor to a rare gas recovery system.

It remains a necessary goal to provide a separation method and device that processes oxygen and produces a relatively concentrated stream of xenon and krypton. The method and device resulting in high recovery of xenon, adjustable recovery of krypton, has high thermodynamic efficiency, and an operating pressure that is independent of other process constraints. Another objective of this invention is to provide a separation method and device that easily integrates into a main air separation plant or that can be applied as a stand-alone or retrofit option. As set forth in more detail below, the inventors have found that the disclosed and claimed process was able to achieve each of these goals.

BRIEF SUMMARY OF THE INVENTION

In an embodiment, a process for the recovery of xenon and/or krypton from a liquid oxygen stream comprising oxygen and xenon and/or krypton is provided, said process comprising:

providing a rare gas recovery system comprising a rare gas recovery column having a top, a bottom, at least one distillation zone, and a reboiling zone comprising a reboiler;

providing at least one liquid oxygen feed comprising oxygen, and xenon and/or krypton;

providing at least a portion of the liquid oxygen feed to the top of rare gas recovery column to form a reflux liquid;

vaporizing a reboiler liquid in the reboiling zone to produce a mixture of a rising vapor and a xenon and/or krypton-enriched liquid stream;

contacting the rising vapor with the reflux liquid in the at least one distillation zone to effect stripping xenon and/or krypton from the rising vapor to the reflux liquid to produce the reboiler liquid;

removing the rising vapor from the top of the rare gas recovery column forming a xenon and/or krypton-lean gaseous oxygen stream;

removing the xenon and/or krypton-enriched liquid stream from the bottom of the rare gas recovery column;

passing the xenon and/or krypton-lean gaseous oxygen steam through a cold compressor forming a cold compressed oxygen stream;

passing the cold compressed oxygen stream through the reboiler producing condensed liquid oxygen by indirect heat exchange with the reboiler liquid in the reboiling zone; and removing the condensed liquid oxygen from the rare gas recovery system as xenon and/or krypton-lean liquid oxygen.

The inventors have realized that high xenon recovery, and variable krypton recovery from a liquid oxygen feed can be achieved without a significant power burden. High recovery of xenon is defined as greater than 90%, preferably greater than 95%. Variable krypton recovery is defined as 15% to 90%, adjustable based on the conditions under which the process operates.

The inventors have also realized that, instead of operating at either the LP column pressure or the oxygen product pressure, the operating pressure of the rare gas column can be adjusted to meet the specific performance targets and still be both economically and energy efficient.

The invention provides such xenon and/or krypton recovery process. These and other advantages of the invention will be apparent from the description of the invention provided herein.

BRIEF DESCRIPTION OF THE DRAWINGS

The process of this invention will be described in detail with reference to the drawings.

DETAILED DESCRIPTION OF THE INVENTION

Figure 1:
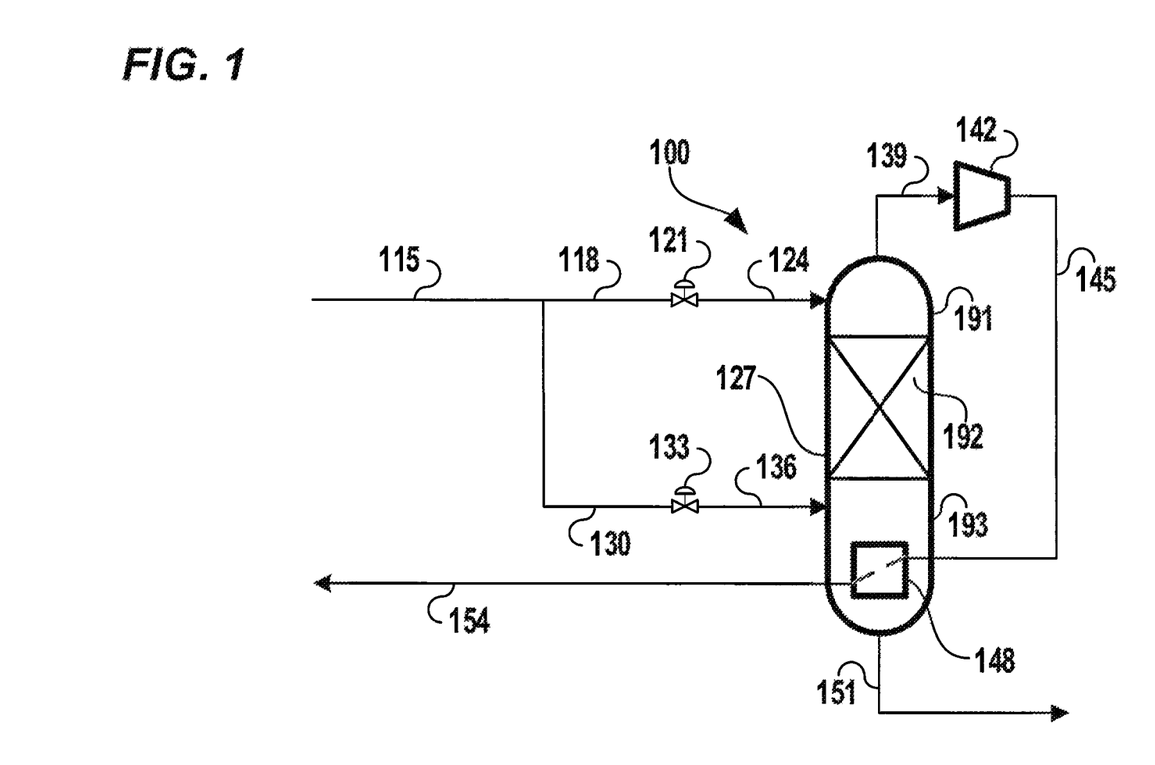
FIG. 1 is a schematic representation of one aspect of the inventive process.

Referring to FIG. 1, a rare gas recovery system 100 is provided and liquid oxygen feed is provided as stream 115. Stream 115 may be a subcooled or saturated liquid, at any pressure greater than that of the rare gas recovery column 127. Stream 115 may be split into a first portion 118 and a second portion 130. At least the first portion 118 is passed through control valve 121 and introduced to the top 191 of column 127 as reflux liquid 124. Optionally, the second portion 130 is passed through control valve 133 and introduced as a second feed to column 127 as feed stream 136. Feed stream 136 can be introduced to column 127 at any location between the top 191 and the reboiling zone 193 near the bottom of the column, but preferably near the bottom of the column.

Within the rare gas recovery column 127 liquid descends through the distillation zone 192 into reboiling zone 193. The reboiling zone 193 contains reboiler 148, an indirect heat exchanger that converts the liquid entering the reboiling zone 193 into rising vapor and xenon and/or krypton-enriched liquid stream 151. The liquid entering the reboiling zone 193 is substantially vaporized, thereby concentrating the less volatile components such as krypton and xenon. Typically, at least 99% of the liquid is vaporized. The rising vapor flows into the distillation zone 192.

Within the distillation zone 192 the rising vapor contacts the descending liquid. The krypton and/or xenon that are contained within the rising vapor are substantially captured by descending liquid. The rising vapor then exits column 127 through the top as stream 139.

Vapor stream 139, which is typically over 99% of the flow to the column, is drawn into cold compressor 142 and is discharged at a higher pressure as stream 145. Stream 145 is drawn into reboiler 148 where it condenses to form condensed liquid oxygen 154. The pressure-rise across the cold compressor 142 is needed to increase the condensing temperature of cold compressed oxygen 145. The higher condensing temperature is required to make heat transfer from the condensing side to the boiling side possible. The heat removed for the condensation provides the heat input to the reboiling zone 193 via reboiler 148.

The magnitude of the pressure-rise needed determines the power to operate cold compressor 142. It is therefore import, for efficient operation, to minimize the pressure-rise. Because the boiling fluid and condensing fluid are virtually the same bulk composition, it is theoretically possible that very little work is expended if the reboiler temperature difference approaches zero and the pressure drop in pipes to and from the cold compressor 142 are minimal. On the other hand, if the circulating flow is high, and piping pressure drop is large, the power to operate such a process could be very large.

The incorporation of a cold compressor thus is a key feature for the operation of the process. In conventional cryogenic processes, cold compression is considered undesirable because the heat of compression must be rejected cold, creating a refrigeration burden on the process and a reduction in power efficiency. However, and surprisingly, the use of cold compression in this process improves power efficiency, relative to warm compression. This occurs by eliminating the parasitic pressure drop power losses associated with 1) warming the fluid from cold operation to ambient in a heat exchanger and associated piping, 2) cooling the compressed gas to remove the heat of compression in a heat exchanger and associated piping, and 3) cooling the fluid from ambient to cold operation in a heat exchanger and associated piping.

In principle, there are few limitations on the operating pressure of the rare gas recovery column. The only exception is that the column pressure be below the critical pressure of oxygen (~50 bara).

Operation at high pressure is desirable for at least three reasons: 1) pressure drop is lower because the gas density is high, 2) pressure drop itself is reduced in importance because the pressure is high and therefore the relative pressure drop is low, and 3) the solid solubility of trace components increases so the flow of xenon and/or krypton-enriched liquid stream 151 (also known as the purge liquid) can be reduced, thereby increasing the concentration of the desirable krypton and xenon. The first two benefits reduce power, the third benefit reduces the downstream purification cost of the purge liquid.

Operation at lower pressure, on the other hand, is desirable for at least two reasons: 1) the loss of krypton and xenon into the vapor leaving column 127 (stream 139) is minimized due to more efficient separation, and 2) equipment cost can be reduced due to lower design pressure.

The loss of krypton and xenon recovery may be reduced at any column pressure by increasing the flow of reflux liquid 124 relative to the flow of liquid feed stream 136 (the lower liquid feed). A potential disadvantage of increasing the flow of reflux liquid 124 is that light hydrocarbons, such as methane, are prevented from being rejected into stream 139 and will therefore build-up to a higher concentration in the xenon and/or krypton-enriched liquid stream 151. Because generally there are hydrocarbon concentration limits on the purge liquid flow, the disadvantage becomes an increase in the process cost due to an increase in the purge liquid flow.

The inventors have discovered that there is a preferred column operating pressure range 5 to 25 bara, and more preferably between 10 and 20 bara. The relative flow of the reflux liquid 124 may be between 10 and 50% of the incoming liquid oxygen feed 115, and preferably between 10 and 30% of the incoming liquid oxygen feed 115.

Figure 2:
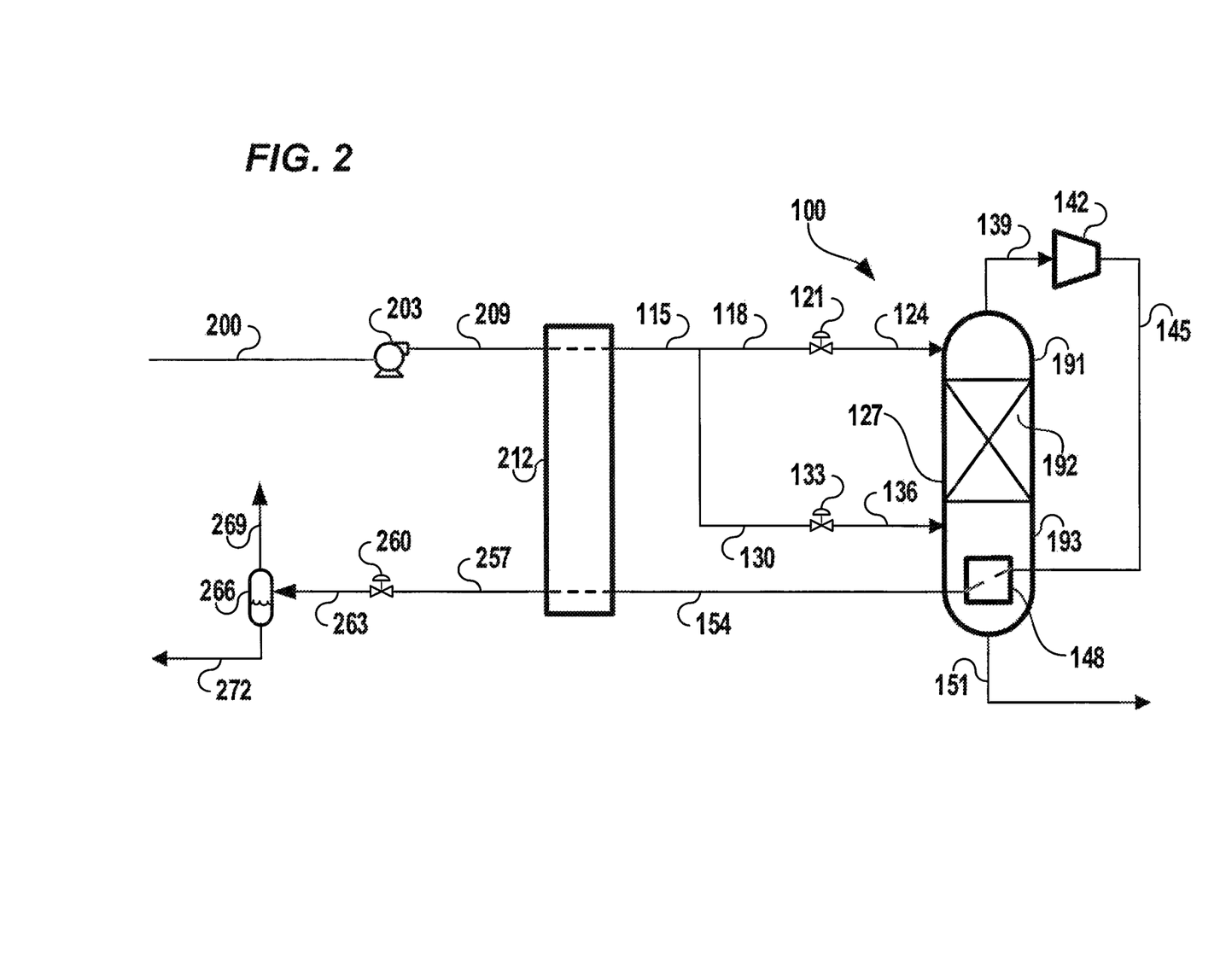
FIG. 2 is a schematic representation of another aspect of the present invention, in which the source of the liquid oxygen feed is derived from a low-pressure liquid oxygen source.

FIG. 2 illustrates the process where the source of the liquid oxygen feed originates from a low-pressure source. A low-pressure liquid oxygen source is provided as stream 200. Stream 200 may be a subcooled or saturated liquid at any pressure greater than the atmospheric pressure, but less than the pressure of rare gas recovery column 127. Stream 200 is compressed in pump 203 to a pressure greater than that of column 127 to form compressed liquid oxygen stream 209. Stream 209 is warmed in desubcooler 212 to produce liquid oxygen feed 115. Stream 115 is processed as described in FIG. 1 to produce xenon and/or krypton-enriched liquid stream 151 and condensed liquid oxygen 154. Stream 154 is cooled in desubcooler 212 to form subcooled xenon and/or krypton-lean liquid oxygen 257. Stream 257 may optionally be reduced in pressure across valve 260 to form stream 263, which is introduced to phase separator 266. The pressure reduction across valve 260 may cause some flash vapor to form, which is removed from separator 266 as stream 269. The liquid remaining after the flash is removed from the separator as low-pressure return liquid 272. The pressure of stream 272 typically, though not necessarily, lies between that of the low-pressure liquid oxygen source and of the rare gas recovery column. Optionally, flash vapor 269 may be routed to any suitable source or destination to recover the oxygen molecules.

Examples of low-pressure liquid oxygen sources may include the sump of the low-pressure column of a cryogenic double column air separation unit, a rundown line from the low-pressure column to the liquid oxygen storage tank, or a liquid oxygen storage tank.

Figure 3:
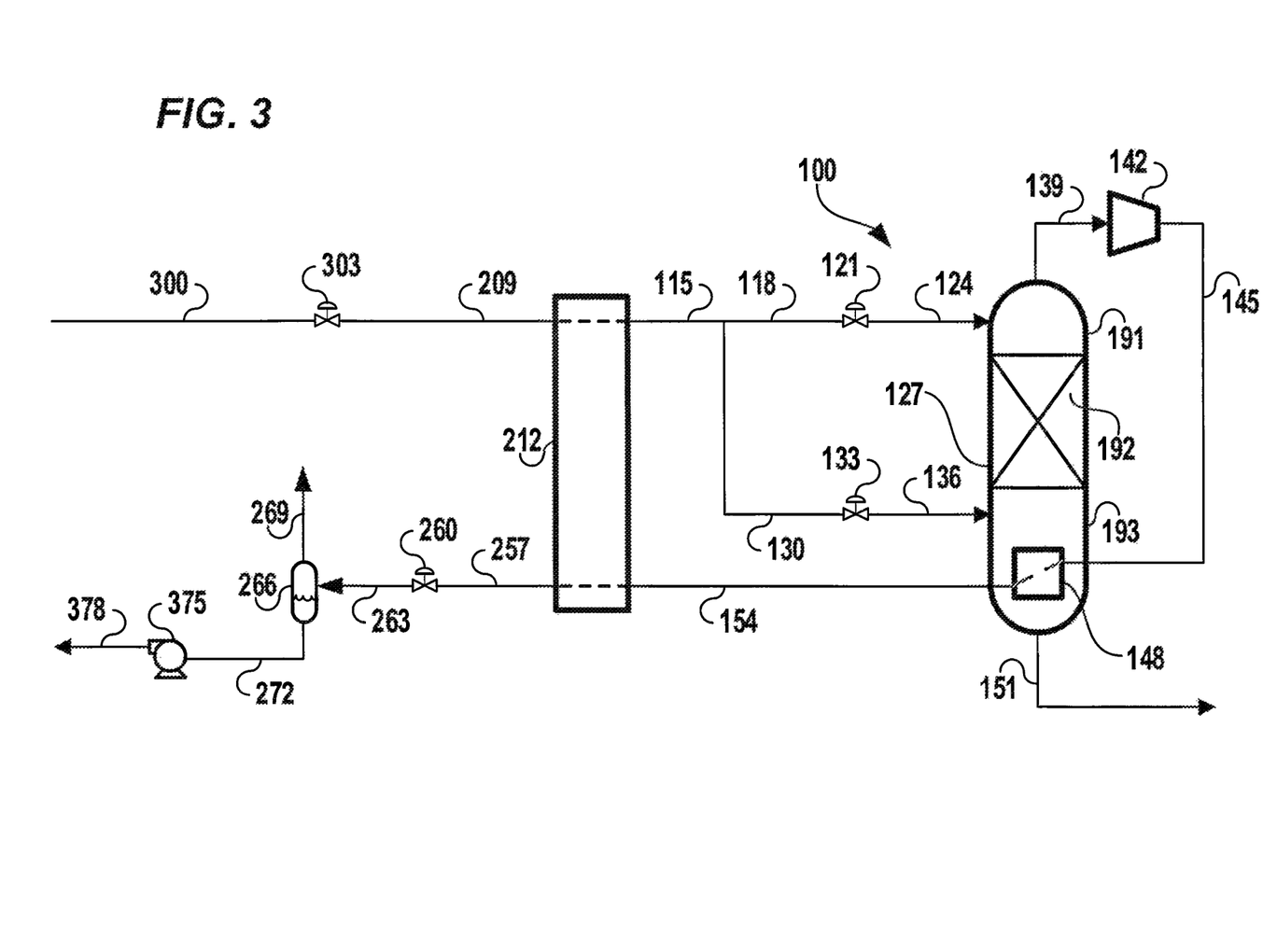
FIG. 3 is a schematic representation of another aspect of the present invention, in which the source of the liquid oxygen feed is derived from a high-pressure liquid oxygen source.

The source of the liquid oxygen feed may also originate from a high-pressure source as illustrated in FIG. 3. A high-pressure liquid oxygen source is provided as stream 300. Stream 300 may be a subcooled liquid at any pressure greater than the pressure of rare gas recovery column 127. Stream 300 is reduced in pressure across valve 303 to a pressure nominally greater than that of column 127 to form stream 209. Stream 209 is warmed in desubcooler 212 to produce liquid oxygen feed 115. Stream 115 is processed as described in FIG. 1 to produce a xenon and/or krypton-enriched liquid stream 151 and condensed liquid oxygen 154. Stream 154 is cooled in desubcooler 212 to form stream 257. Stream 257 may be optionally reduced in pressure across valve 260 to form stream 263, which is introduced to phase separator 266. The pressure reduction across valve 260 may cause some flash vapor to form, which is removed from separator 266 as stream 269. The liquid remaining after the flash is removed from the separator as low-pressure return liquid 272. The pressure of stream 272 typically, though not necessarily, lies between 1.0 bara and 3.0 bara. Stream 272 is increased in pressure through pump 375 to produce high-pressure return liquid 378. Optionally, flash vapor 269 may be routed to any suitable source to recover the oxygen molecules.

An example of a high-pressure liquid oxygen source is the pump discharge from a well known pumped-LOX cycle. Typically, the pressure of this source is greater than 30 bara, and often, in excess of 60 bara. At pressures close to 30 bara, the distillation of oxygen containing fluids is difficult, and at any pressure greater than the critical pressure of oxygen (~50 bara), the distillation is impossible. When a high-pressure source is utilized, the pressure of high-pressure return liquid will typically correspond to source pressure.

Examples

By way of an example of the invention, a simulation of the process depicted in FIG. 1 has been carried out. The results of the simulation are shown in Table 1.

TABLE 1

| Material balance for 15 bara column pressure and 30% reflux | | | | | | | | |
|---|---|---|---|---|---|---|---|---|
| Stream | | 115 | 118 | 130 | 139 | 145 | 154 | 151 |
| Flow | Nm3/hr | 106003 | 31801 | 74202 | 105703 | 105703 | 105703 | 300 |
| Pressure | bara | 16.0 | 16.0 | 16.0 | 15.0 | 16.6 | 16.5 | 15.0 |
| Temperature | C. | −146.6 | −146.6 | −146.6 | −146.2 | −141.6 | −144.4 | −146.2 |
| | | | | Molar Comp | | | | |
| Argon | % | 0.29 | 0.29 | 0.29 | 0.29 | 0.29 | 0.29 | 0.23 |
| Oxygen | % | 99.7 | 99.7 | 99.7 | 99.7 | 99.7 | 99.7 | 99.61 |
| carbon dioxide | ppm | 0.24 | 0.24 | 0.24 | 0.01 | 0.01 | 0.01 | 83.0 |
| Methane | ppm | 48.60 | 48.60 | 48.60 | 48.20 | 48.20 | 48.20 | 186.7 |
| Krypton | ppm | 5.54 | 5.54 | 5.54 | 4.58 | 4.58 | 4.58 | 344.6 |
| Xenon | ppm | 0.42 | 0.42 | 0.42 | 0.01 | 0.01 | 0.01 | 144.0 |
| nitrogen dioxide | ppm | 0.97 | 0.97 | 0.97 | 0.02 | 0.02 | 0.02 | 336.9 |
| Ethane | ppm | 0.49 | 0.49 | 0.49 | 0.01 | 0.01 | 0.01 | 169.7 |
| Ethylene | ppm | 0.92 | 0.92 | 0.92 | 0.04 | 0.04 | 0.04 | 310.7 |
| Propane | ppm | 0.18 | 0.18 | 0.18 | 0.00 | 0.00 | 0.00 | 63.6 |

The results demonstrate that a xenon recovery of greater than 97.0% is achieved while reducing the purge liquid flow to 0.3% of the liquid oxygen feed. The power to drive the cold compressor is modest, only 161 kW. This is due to a low compression ratio of approximately 1.1. The temperature difference associated with reboiler 148 is 1.0° C., which is reasonable for this service, and was verified by calculation.

Typically, and based on the teachings of the prior art, one of ordinary skill in the art would consider it preferred to compress stream 139, the vapor from the rare gas recovery column, at ambient temperature. However, the inventors have discovered that such an approach would be considerably less efficient for this process. Compressing at ambient temperature would require the following steps: 1) warm stream 139 to ambient temperature in a heat exchanger, 2) compress the warmed gas, 3) cool the compressed, and hot, gas in a compressor aftercooler to near ambient temperature, 4) cool the in ambient gas the temperature of stream 145.

As disclosed in Example 1, the pressure of stream 139 at the column is 15 bara; the pressure at the inlet of the reboiler 148 is 16.6 bara. Assuming no piping pressure drop between the column and the compressor, and no piping pressure drop between the compressor and Reboiler 148, the compression ratio (CR) would be 1.107 (16.6/15.0). For a commercial-sized plant, however, piping pressure drop (dP) from the column to cold compressor suction, and from the cold compressor discharge to the reboiler 148 would each be about 0.05 bara. The suction pressure at the compressor suction would be 14.95 bara, and at the compressor discharge would be 16.65 bara. The resultant compression ratio (CR) is 1.113 (16.65/14.95). Considering a process that were to compress at the ambient temperature condition, the pressure drop upstream of the compressor would be 0.25 bara (0.1 through piping plus 0.15 bar in heat exchanger); the pressure drop down stream of the compressor would be 0.35 bar (0.1 through piping plus 0.1 in compressor aftercooler+0.15 bara in heat exchanger). The resultant compression ratio across this warm compressor would be 1.142 (16.85/14.75).

Compression power is proportional to $F*T*\ln(CR)$, where F is the flow rate, T is the average absolute temperature of the compression (K), and CR is the compression ratio. A comparison of the three cases described above is tabulated in Table 2. The circulating flow (F) is the same for all cases.

TABLE 2

Comparison of Cold compression vs Warm Compression

| Alternative | CR | Ln(CR) | T (K) | T * ln(CR) | Relative |
|---|---|---|---|---|---|
| 1. Cold Comp, No dP losses | 1.107 | .1017 | 127 | 12.9 | 1.00 |
| 2. Cold Comp, w dP losses | 1.113 | .1071 | 127 | 13.6 | 1.06 |
| 3. Warm Comp, w dP losses | 1.142 | .1328 | 300 | 39.8 | 3.09 |

The term "Relative" refers to the ratio of the terms: T * ln(CR)

The results in Table 2 illustrate that, comparing case 2 to case 3, the difference in pressure drop results in a 25% in power difference. The greater difference between cold compression and warm compression is due to the temperature of compression. Normally, the apparent benefit of cold compression is negated by the fact that refrigeration needs to be supplied to remove the heat of cold compression. In contrast, the heat of warm compression is rejected to the ambient aftercooler.

The temperature rise across the cold compressor is only 4.6° C. Therefore, 4.6° C. of gas cooling must be provided by external refrigeration at a temperature of approximately −146° C. In contrast, to carry out the warm compression, a warm-up/cool-down heat exchanger must be employed to warm the gas from −146° C. to nominally 25° C., and to cool the gas from nominally 30° C. to a colder temperature, which by energy balance, would be −141° C. Therefore, to make the heat exchanger operation feasible, there would need to be a temperature difference of 5° C., which represents a loss of refrigeration, also at approximately −146° C. The consequence is that, to a first order approximation, the refrigeration demand needed to compensate for the heat of cold compression is equal to the refrigeration demand needed to feasibly operate the heat exchanger needed to carry out warm compression. Therefore, the elimination of recycling to the ambient and compressing warm results in a real, and unanticipated, 66% reduction in power (as suggested by Table 1).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It will be appreciated that the invention is not restricted to the details described above with reference to the preferred embodiments but that numerous modifications and variations can be made without departing from the spirit and scope of the invention as defined by the following claims.

What is claimed is:

1. A process for the recovery of xenon and/or krypton from a liquid oxygen stream comprising oxygen and xenon and/or krypton, said process comprising:
   providing a rare gas recovery system comprising a rare gas recovery column having a top, a bottom, at least one distillation zone, and a reboiling zone comprising a reboiler;
   providing a liquid oxygen feed comprising oxygen and xenon and/or krypton;
   providing a first portion of the liquid oxygen feed to the top of rare gas recovery column to form a reflux liquid;
   providing a low-pressure liquid oxygen stream;
   vaporizing a reboiler liquid in the reboiling zone to produce a mixture of a rising vapor and a xenon and/or krypton-enriched liquid stream;

contacting the rising vapor with the reflux liquid in the at least one distillation zone to effect stripping xenon and/or krypton from the rising vapor to the reflux liquid to produce the reboiler liquid;

removing the rising vapor from the top of the rare gas recovery column forming a xenon and/or krypton-lean gaseous oxygen stream;

removing the xenon and/or krypton-enriched liquid stream from the bottom of the rare gas recovery column;

passing the xenon and/or krypton-lean gaseous oxygen stream directly through a cold compressor forming a cold compressed oxygen stream;

passing the cold compressed oxygen stream through the reboiler producing condensed liquid oxygen by indirect heat exchange with the reboiler liquid in the reboiling zone; and removing the condensed liquid oxygen from the rare gas recovery system as xenon and/or krypton-lean liquid oxygen;

compressing the low-pressure liquid oxygen stream in a pump, to a pressure greater than the operating pressure of the rare gas recovery column, forming a compressed liquid oxygen stream;

warming the compressed liquid oxygen stream by indirect heat exchange in a desubcooler to form the liquid oxygen feed; and passing the condensed liquid oxygen to the desubcooler, and cooling by indirect heat exchange with the compressed liquid oxygen stream, to produce a subcooled xenon and/or krypton-lean liquid oxygen;

wherein the rare gas recovery column is operated at an operating pressure of between 5 to 25 bara.

2. The process according to claim 1, further comprising providing a second portion of the liquid oxygen feed to the rare gas recovery column at a position between the at least one distillation zone and the reboiling zone.

3. The process according to claim 1, wherein the rare gas recovery column is operated at an operating pressure of between 10 and 20 bara.

4. The process according to claim 1, further comprising reducing the pressure of the subcooled xenon and/or krypton-lean liquid oxygen in a valve and passing the subcooled xenon and/or krypton-lean liquid oxygen to a phase separator forming a low-pressure return liquid.

5. The process according to claim 1, further comprising providing a high-pressure liquid oxygen stream, reducing the pressure of the high-pressure liquid oxygen stream in a valve to a pressure greater than the operating pressure of the rare gas recovery column forming a compressed liquid oxygen stream, warming the compressed liquid oxygen stream by indirect heat exchange in a desubcooler to form the liquid oxygen feed; and passing the condensed liquid oxygen to the desubcooler and cooling by indirect heat exchange with the compressed liquid oxygen stream to produce a subcooled xenon and/or krypton-lean liquid oxygen.

6. The process according to claim 5, further comprising reducing the pressure of subcooled xenon and/or krypton-lean liquid oxygen in a valve, and passing the subcooled xenon and/or krypton-lean liquid oxygen to a phase separator forming a low-pressure return liquid, and
compressing the low-pressure return liquid in a pump to form a high-pressure return liquid.

7. The process according to claim 6, wherein the pressure of the high-pressure return liquid is greater than or equal to the pressure of the high-pressure liquid oxygen stream.

8. The process according to claim 1, wherein a xenon recovery of 90% or greater is achieved, based on the concentration of xenon in the liquid oxygen feed.

9. The process according to claim 1, wherein a xenon recovery of 95% or greater is achieved, based on the concentration of xenon in the liquid oxygen feed.

10. The process according to claim 1, wherein the first portion of the liquid oxygen feed is between 10 and 50% of the liquid oxygen feed.

11. The process according to claim 1, wherein a krypton recovery of 15% to 90% is achieved, based on the concentration of krypton in the liquid oxygen feed.

12. A process for the recovery of xenon and/or krypton from a liquid oxygen stream comprising oxygen and xenon and/or krypton, said process comprising:

providing a rare gas recovery system comprising a rare gas recovery column having a top, a bottom, at least one distillation zone, and a reboiling zone comprising a reboiler;

providing a liquid oxygen feed comprising oxygen and xenon and/or krypton;

providing a first portion of the liquid oxygen feed to the top of rare gas recovery column to form a reflux liquid;

providing a high-pressure liquid oxygen stream;

vaporizing a reboiler liquid in the reboiling zone to produce a mixture of a rising vapor and a xenon and/or krypton-enriched liquid stream;

contacting the rising vapor with the reflux liquid in the at least one distillation zone to effect stripping xenon and/or krypton from the rising vapor to the reflux liquid to produce the reboiler liquid;

removing the rising vapor from the top of the rare gas recovery column forming a xenon and/or krypton-lean gaseous oxygen stream;

removing the xenon and/or krypton-enriched liquid stream from the bottom of the rare gas recovery column;

passing the xenon and/or krypton-lean gaseous oxygen stream directly through a cold compressor forming a cold compressed oxygen stream;

passing the cold compressed oxygen stream through the reboiler producing condensed liquid oxygen by indirect heat exchange with the reboiler liquid in the reboiling zone;

removing the condensed liquid oxygen from the rare gas recovery system as xenon and/or krypton-lean liquid oxygen;

reducing the pressure of the high-pressure liquid oxygen stream in a valve, to a pressure greater than the operating pressure of the rare gas recovery column, forming a compressed liquid oxygen stream;

warming the compressed liquid oxygen stream by indirect heat exchange in a desubcooler to form the liquid oxygen feed;

passing the condensed liquid oxygen to the desubcooler and cooling, by indirect heat exchange with the compressed liquid oxygen stream, to produce a subcooled xenon and/or krypton-lean liquid oxygen;

wherein the rare gas recovery column is operated at an operating pressure of between 5 to 25 bara.

13. The process according to claim 12, further comprising providing a second portion of the liquid oxygen feed to the rare gas recovery column at a position between the at least one distillation zone and the reboiling zone.

14. The process according to claim 12, wherein the rare gas recovery column is operated at an operating pressure of between 10 and 20 bara.

15. The process according to claim 12, further comprising reducing the pressure of the subcooled xenon and/or krypton-lean liquid oxygen in a valve, and passing the subcooled xenon and/or krypton-lean liquid oxygen to a phase separator forming a low-pressure return liquid, and
   compressing the low-pressure return liquid in a pump to form a high-pressure return liquid.

16. The process according to claim 15, wherein the pressure of the high-pressure return liquid is greater than or equal to the pressure of the high-pressure liquid oxygen stream.

17. The process according to claim 12, wherein a xenon recovery of 90% or greater is achieved, based on the concentration of xenon in the liquid oxygen feed.

18. The process according to claim 12, wherein a xenon recovery of 95% or greater is achieved, based on the concentration of xenon in the liquid oxygen feed.

19. The process according to claim 12, wherein the first portion of the liquid oxygen feed is between 10 and 50% of the liquid oxygen feed.

20. The process according to claim 12, wherein a krypton recovery of 15% to 90% is achieved, based on the concentration of krypton in the liquid oxygen feed.

\* \* \* \* \*